W. P. WYNNE.
ATTACHMENT FOR CONVERTING MOTOR PROPELLED VEHICLES INTO TRACTORS.
APPLICATION FILED JUNE 29, 1914.
1,147,131.
Patented July 20, 1915.
2 SHEETS—SHEET 1.
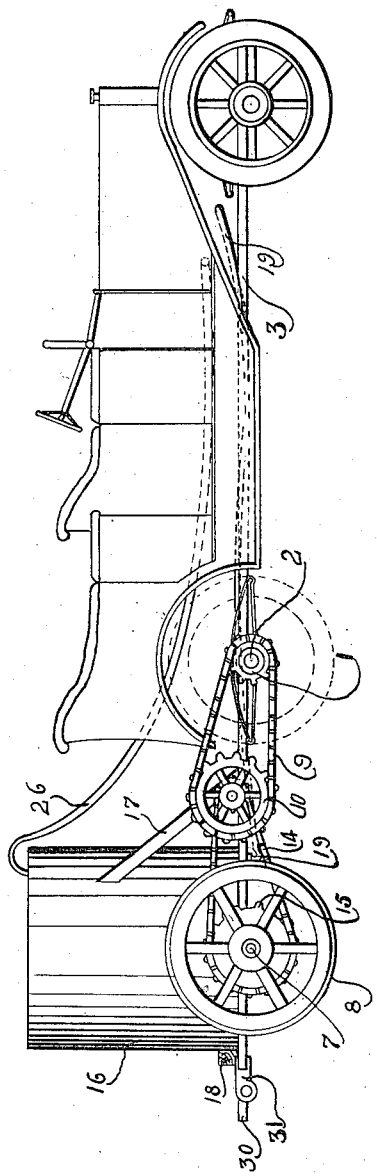
Witnesses
J. F. Curry
Inventor
William P. Wynne
By A. L. Jackson,
Attorney

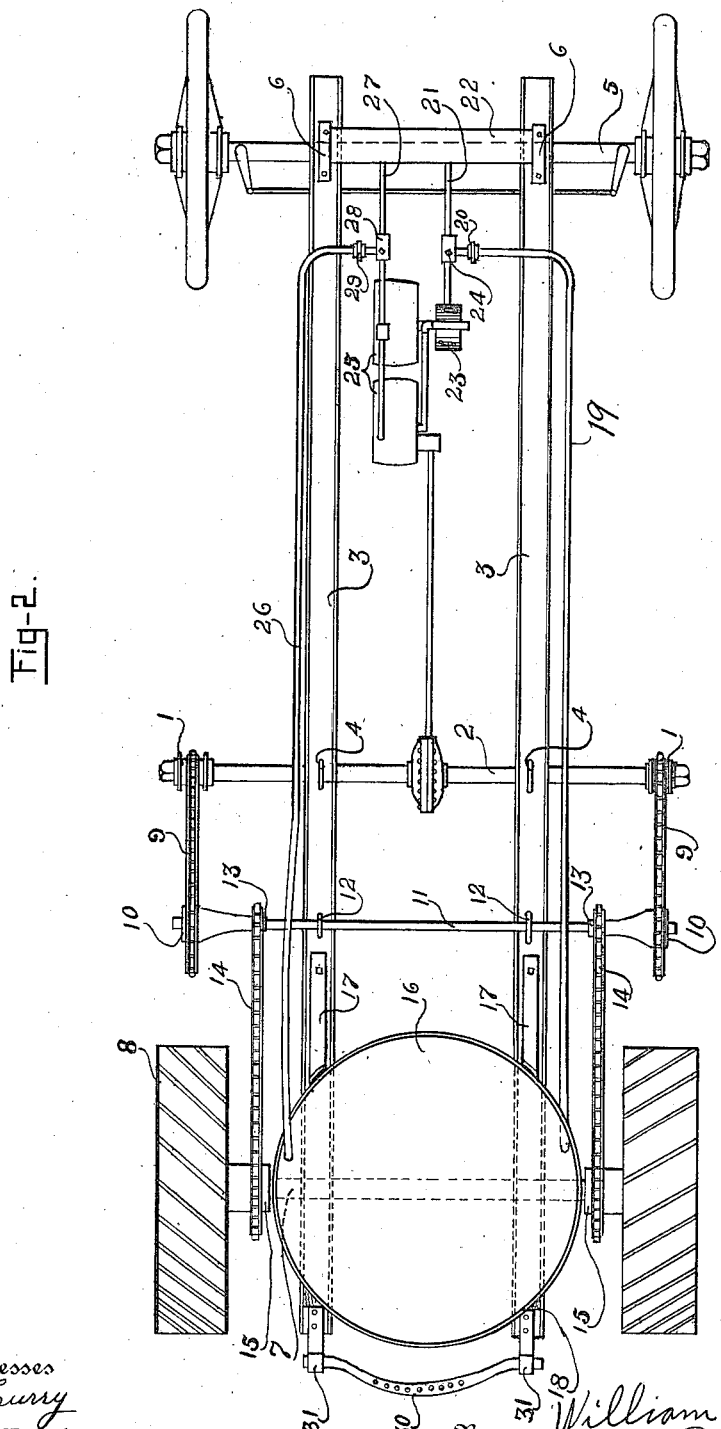

UNITED STATES PATENT OFFICE.

WILLIAM P. WYNNE, OF FORT WORTH, TEXAS.

ATTACHMENT FOR CONVERTING MOTOR-PROPELLED VEHICLES INTO TRACTORS.

1,147,131.   Specification of Letters Patent.   Patented July 20, 1915.

Continuation of application Serial No. 824,668, filed March 14, 1914. This application filed June 29, 1914. Serial No. 847,817.

*To all whom it may concern:*

Be it known that I, WILLIAM P. WYNNE, a citizen of the United States, residing at Fort Worth, in the county of Tarrant and State of Texas, have invented certain new and useful Improvements in Attachments for Converting Motor-Propelled Vehicles into Tractors, of which the following is a specification.

My invention relates to tractors and more particularly to attachments to vehicles, and the object is to provide tractors which may be attached to vehicles and particularly to motor propelled vehicles, to provide tractors which can be used to draw plows, harrows, cultivators, mowers, reapers, and other agricultural implements.

One object is to provide a tractor which can be quickly attached to or detached from any ordinary vehicle, and which may be conveniently attached by removing the rear wheels of the vehicle and putting tractor drive wheels in their places and then supporting the rear part of the vehicle on the tractor frame.

Another object and advantage is to provide tractor attachments which will leave all parts of the power plant of the motor vehicle and all bearings in their normal positions so that there will be no disturbance of the working parts and no disturbance of the lubricating systems of the running gear.

Other objects and advantages will be fully explained in the following description and the invention will be more particularly pointed out in the claims.

Reference is had to the accompanying drawings which form a part of this application.

Figure 1 is a side elevation of a motor vehicle with a tractor attached thereto, with the rear wheels of the vehicle removed and shown in dotted outline. Fig. 2 is a diagrammatic plan view, showing sufficient parts of the vehicle to illustrate the connection of the tractor mechanism thereto.

Similar characters of reference are used to indicate the same parts throughout the several views.

The tractor is preferably attached to the vehicle by removing the rear wheels of the vehicle and putting in their place small sprocket wheels 1. The sprocket wheels should have the same length hub and similar interior structure that the removed wheels have, thus making feasible and practical to change the wheels on the vehicle whenever desirable. The vehicle can thus be used for transportation purposes or for power purposes. A person can ride to his field in his vehicle, take off the rear wheels of the vehicle, and then attach the tractor and be ready for plowing or other work. When he quits work, he can detach the tractor and put on the vehicle wheels for traveling. The rear axle 2 of the vehicle is supported on the tractor beams 3 which are connected to the axle 2 by U-bolts 4 and the beams 3 may be either above or below the axle 2. The beams 3 are extended to the front part of the vehicle on top or bottom of the front axle 5 and attached thereto by U-bolts 6. The rear ends of the beams 3 are supported on the axle 7 which is provided with traction wheels 8. The axle 7 and the beams 3 and the tractor wheels are so positioned relative to the body of the vehicle that the body of the vehicle and the running gear thereof will operate in their normal positions. The wheels 7 can be made larger or smaller in diameter. It will be seen that the wheels 7 can be large enough in diameter to permit the beams 3 to be placed on top of the axle 2 and under the axle 5 without disturbing the normal position of the body and running gear of the vehicle.

The wheels 1 drive sprocket chains 9 and the chains 9 drive sprocket wheels 10 which are loosely mounted on a counter shaft 11 which is mounted on beams 3 and connected therewith by U-bolts 12. The wheels 1 are driven by the differential gearing of the vehicle. Sprocket wheels 13 are rigid with the sprocket wheels 10 and are driven thereby. The sprocket wheels 13 drive sprocket chains 14 and these chains drive sprocket wheels 15 which are rigid with the main supporting wheels 8. Thus the traction wheels 8 are driven from the vehicle gearing which is driven by the power plant of the vehicle. The vehicle driving gear is not described or illustrated in detail because no claim is made for the vehicle driving gear, and this gearing need be shown only in conventional form. The gear ratio can be varied or changed for suitable speed and power. The gearing illustrated shows a reduction of speed and a gain in power. The arrangement of the sprocket wheels 13 rigid with the wheels 10 and loose on the shaft 11 and the gear wheels 15 rigid with the wheels 8 and loose on the shaft 7 conserve the advantage gained by the differential gearing of the vehicle. A yoke 30 is pivotally connected to beams 3 by clips 31 for drawing plows or implements.

A water tank is carried on the tractor frame and held in place thereon by braces 17 which are attached to the beams 3 and to the tank and by foot braces 18 which are attached to the frame beams 3. A hose 19 is connected to the bottom of the tank 16 and extended forward and connected by a coupling 20 to the hose 21 which connects the radiator 22 with the pump 23. The hose 21 is provided with a three-way cock 24 so that the water from the radiator 22 can be cut-off and the water from the hose 19 connected in the hose 21 and sent to the pump 23 which delivers the water to the jackets of the cylinders in the casings 25. A hose 26 is connected to the upper part of the tank 16 and extended forward and connected to the hose 27 which is connected to the upper part of radiator 22 and to the upper parts of the jackets of the cylinder casings 25. The pipe 27 is provided with a three-way cock 28 for the purpose of turning the water from the radiator 22 and directing the same through the hose 26 to the tank 16. The hose 26 is connected to the hose 27 by a coupling 29. The couplings 20 and 28 and the three-way cocks 24 and 29 thus provide means by which the water may be used either from the radiator 22 or from the tank 16.

The water tank 16 provides the necessary increased quantity of water for cooling the engine. This is necessary in the constant slow movement of the vehicle when plowing or doing other work. In slow movement there may not be sufficient cooling of the radiator by air. The large tank makes feasible and practical the necessary variation of the weight on the traction wheels. For some plows a fixed weight will be necessary and other plows or implements will require a greater weight. The weight can be varied as desired by the amount of water placed in the tank 16. The tank is thus made to perform a double function.

By means of the provision herein set forth, an automobile or a motor propelled vehicle of ordinary construction can be readily converted into a tractor for drawing plows or other agricultural implements without disturbing the working parts or running gear of the vehicle and without changing position of the body and the lubricating systems, the body remaining in its normal position which is usually horizontal.

What I claim, is,—

1. A tractor for plows for attachment to a motor vehicle comprising beams attached to the axles of the vehicle and supporting the rear axle of the vehicle, an axle and supporting wheels therefor supporting the rear ends of said beams, means for driving each one of said wheels independently of each other from the rear axle of the vehicle, and an adjustable weight mounted on said beams over said last mentioned axle.

2. A tractor for plows for attachment to a motor vehicle comprising beams attached to the axles of the vehicle and supporting the rear axle of the vehicle, an axle attached to and supporting the rear part of said beams, traction and supporting wheels loosely engaging said supporting axle, means for driving each one of said wheels independently of each other, a water tank mounted on said beams over said supporting axle, and pipes connecting said tank with the pump and water-jackets of said vehicle.

3. A tractor for plows for attachment to a motor vehicle comprising beams attached to the axles of the vehicle and supporting the rear axle of the vehicle, a rear supporting axle attached to said beams, traction wheels engaging said axle loosely, sprocket wheels mounted on and driven by the rear axle of the vehicle, gearing operatively connecting said sprocket wheels to said traction wheels, and a water tank mounted on said beams above said rear supporting axle.

4. In a motor vehicle provided with the usual differential axle and gearing, a tractor for plows having beams attached to the axles of the vehicle and supporting the differential axle, a rear supporting axle and traction wheels loosely engaging said supporting axle, sprocket wheels mounted on said differential axle in place of the rear wheels of the vehicle which are removed, and gearing operatively connecting said sprocket wheels to said traction wheels for driving the same.

5. In a motor vehicle having the usual differential axle and gearing, a tractor for plows provided with beams attached to the axles of the vehicle and supporting the differential axle, the vehicle wheels being removed from the differential axle, a rear supporting axle attached to said beams, traction wheels engaging said rear-supporting axle loosely, sprocket wheels mounted on said differential axle and driven thereby, a counter-shaft mounted on and rigid with said beams, gearing operatively connecting said sprocket wheels to said counter-shaft, and gearing operatively connecting said counter shaft with said traction wheels.

6. The combination with a single pair of tractor wheels, of means between and extending forward of said wheels for supporting the rear end of an automobile in its normal position with its rear wheels removed and sprocket wheels substituted therefor and with its front wheels on the ground, the whole affording a four wheel vehicle, and driving connections between the power plant of said automobile and said tractor wheels.

7. The combination with an automobile of a pair of tractor wheels, a frame supported thereon, and affording means to support the rear end of the automobile thereon, means on said frame for rigidly engaging the housing of the rear axle of the automobile with the wheels removed, means supporting the front end of the frame on and securing the same to the front end of the automobile, and driving connections between the tractor wheels and the power plant of the automobile, including sprocket wheels in place of the removed wheels.

8. In a tractor attachment for automobiles, a pair of tractor wheels, a frame therefor adapted to support the rear end of an automobile, said frame adapted to be detachably supported by the front end of said automobile, and driving connections between the automobile driving gear and the tractor wheels, including sprocket wheels substituted in place of the rear wheels of the automobile.

9. The combination with a single pair of tractor wheels, of means supported by and extending forward of said wheels for supporting the rear end of an automobile in its normal position with its front wheels on the ground, the whole affording a four wheel vehicle, and driving connections between the power plant of said automobile and said tractor wheels including sprocket wheels substituted for the rear wheels of the vehicle which are removed.

10. In a tractor attachment for motor vehicles, a pair of tractor wheels, an axle and a frame therefor adapted to support the rear end of an automobile, said frame adapted to be detachably supported by the front end of said automobile, driving connections between the power plant of the automobile and said tractor wheels, and means carried on said frame above said axle between said tractor wheels and operatively connected with the water tank of the automobile power plant for controlling the temperature of the water tank for said power plant and for regulating the weight on said frame.

In testimony whereof, I set my hand in the presence of two witnesses, this 25th day of June, 1914.

WILLIAM P. WYNNE.

Witnesses:
A. L. JACKSON,
J. W. STITT.